(12) United States Patent  
Habash

(10) Patent No.: US 9,152,956 B1  
(45) Date of Patent: Oct. 6, 2015

(54) AUTOMATED KIOSK ASSEMBLY

(71) Applicant: Sam G. Habash, Hawthorne, CA (US)

(72) Inventor: Sam G. Habash, Hawthorne, CA (US)

( * ) Notice: Subject to any disclaimer, the term of this patent is extended or adjusted under 35 U.S.C. 154(b) by 0 days.

(21) Appl. No.: 14/273,014

(22) Filed: May 8, 2014

(51) Int. Cl.
| | |
|---|---|
| *G01N 33/497* | (2006.01) |
| *G06Q 20/20* | (2012.01) |
| *G07B 15/00* | (2011.01) |
| *G06Q 50/30* | (2012.01) |

(52) U.S. Cl.
CPC .............. *G06Q 20/202* (2013.01); *G06Q 50/30* (2013.01); *G07B 15/00* (2013.01)

(58) Field of Classification Search
USPC .......................... 235/379; 422/84–87; 73/23.3
See application file for complete search history.

(56) References Cited

U.S. PATENT DOCUMENTS

| | | | |
|---|---|---|---|
| 5,303,575 A | 4/1994 | Brown et al. | |
| 6,177,051 B1 | 1/2001 | Kimelman | |
| 6,205,840 B1 | 3/2001 | Thompson | |
| 2001/0037070 A1 | 11/2001 | Cranley et al. | |
| 2007/0073113 A1 | 3/2007 | Squilla et al. | |
| 2009/0137047 A1 | 5/2009 | Regan et al. | |
| 2012/0022890 A1 | 1/2012 | Williams et al. | |

FOREIGN PATENT DOCUMENTS

JP         07167864       7/1995

*Primary Examiner* — Jamara Franklin

(57) ABSTRACT

An automated kiosk assembly includes a housing coupled to a support surface. A processor is coupled to the housing. A blood alcohol analyzer is coupled to the housing and the processor. A display is coupled to the housing and the processor. A user touches the display so the user actuates the processor. A payment acceptor is coupled to the housing and the processor. A dispenser is coupled to the housing and the processor. The dispenser selectively dispenses a straw. An input is coupled to the housing and the blood alcohol analyzer. The user operationally couples the straw to the input. The user exhales through the straw so the blood alcohol analyzer determines a blood alcohol content of the user. A transceiver is coupled to the housing and the processor. The transceiver contacts a taxi service if the user's blood alcohol content is above a legal limit.

16 Claims, 6 Drawing Sheets

AUTOMATED KIOSK ASSEMBLY

BACKGROUND OF THE DISCLOSURE

Field of the Disclosure

The disclosure relates to kiosk devices and more particularly pertains to a new kiosk device for determining a blood alcohol content of a user.

SUMMARY OF THE DISCLOSURE

An embodiment of the disclosure meets the needs presented above by generally comprising a housing coupled to a support surface. A processor is coupled to the housing. A blood alcohol analyzer is coupled to the housing. The blood alcohol analyzer is operationally coupled to the processor. A display is coupled to the housing. The display is operationally coupled to the processor. A user touches the display so the user actuates the processor. A payment acceptor is coupled to the housing. The payment acceptor is operationally coupled to the processor. The payment acceptor accepts monetary currency from the user. A dispenser is coupled to the housing. The dispenser is operationally coupled to the processor. The dispenser dispenses a straw when the payment acceptor receives the monetary currency from the user. An input is coupled to the housing. The input is operationally coupled to the blood alcohol analyzer. The user operationally couples the straw to the input. The user exhales through the straw so the blood alcohol analyzer determines a blood alcohol content of the user. A transceiver is coupled to the housing. The transceiver is operationally coupled to the processor. The transceiver is in communication with an external electronic device. The transceiver contacts a taxi service if the user's blood alcohol content is above a legal limit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
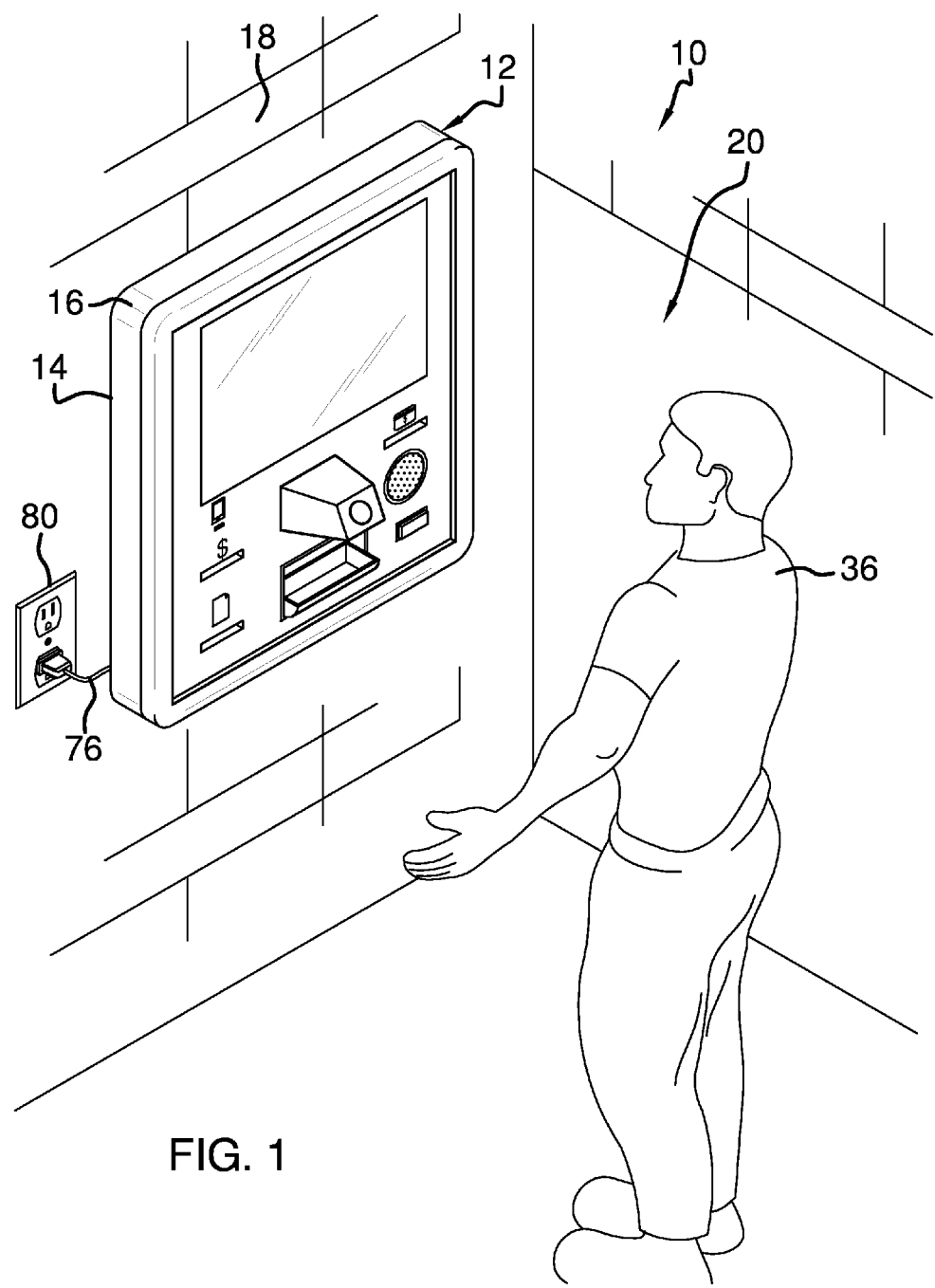
FIG. 1 is a perspective view of a automated kiosk assembly according to an embodiment of the disclosure.
Figure 2:
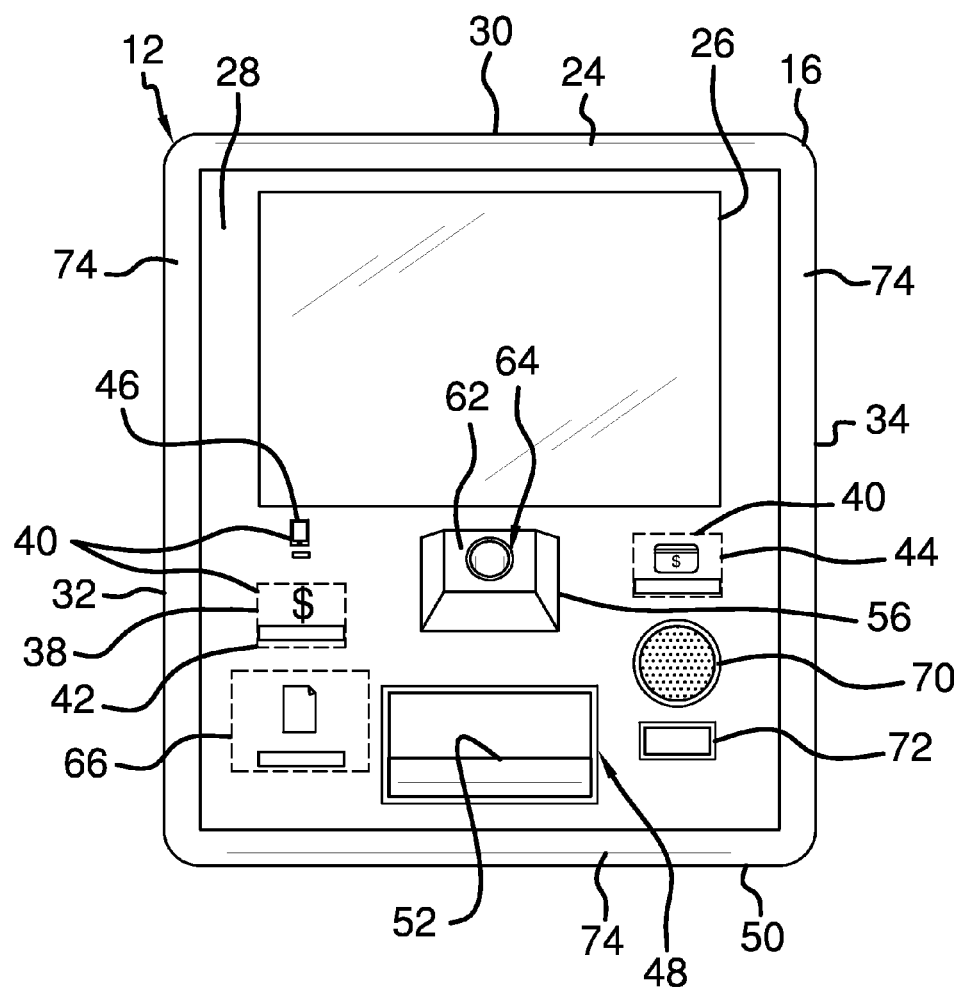
FIG. 2 is a front view of an embodiment of the disclosure.
Figure 3:
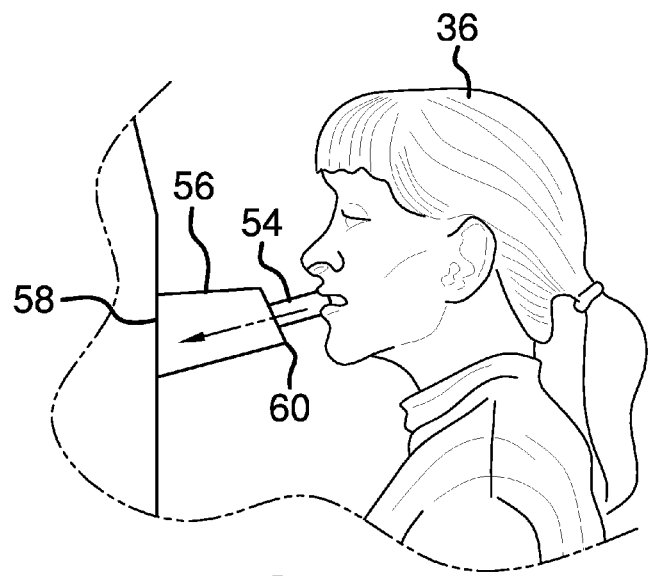
FIG. 3 is an in-use view of an embodiment of the disclosure.
Figure 4:
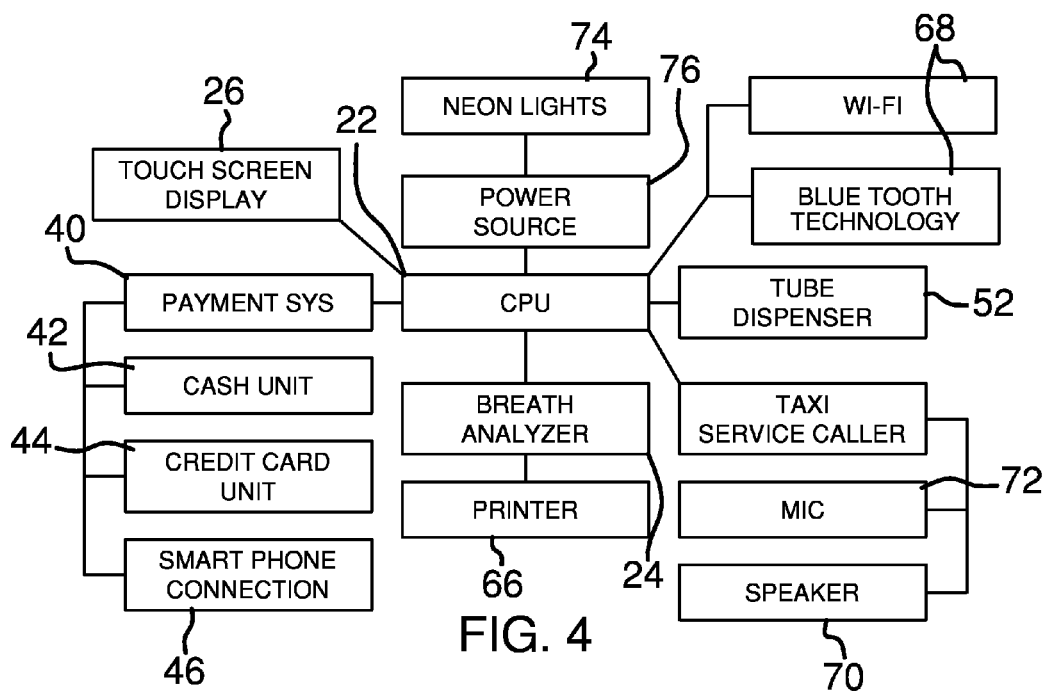
FIG. 4 is a schematic view of an embodiment of the disclosure.
Figure 5:
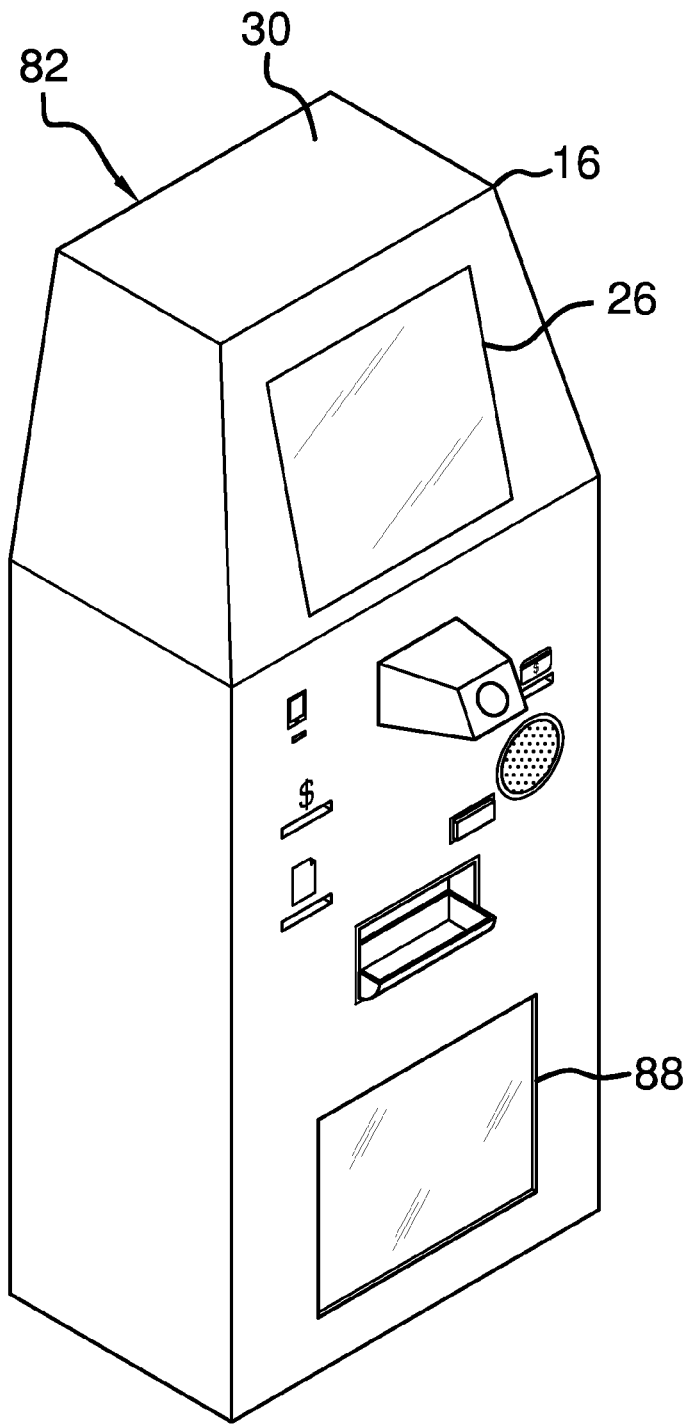
FIG. 5 is a front perspective view of an alternative embodiment of the disclosure.
Figure 6:
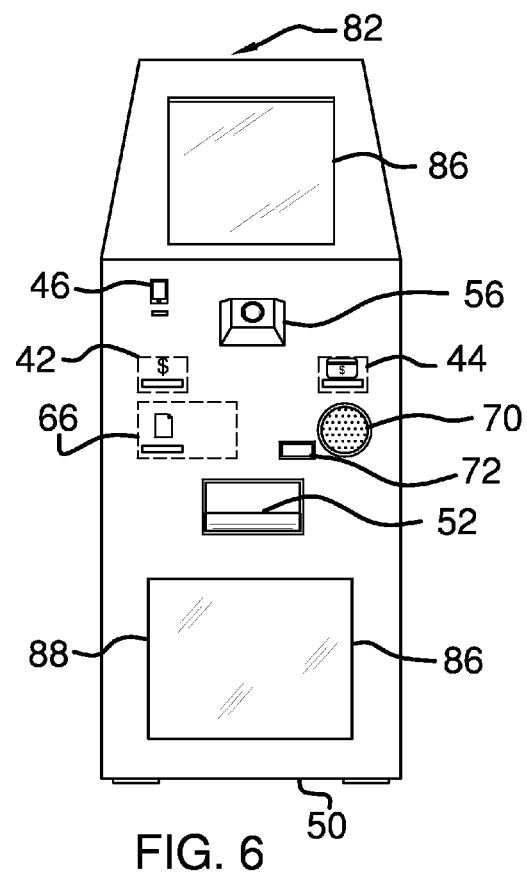
FIG. 6 is a front view of an alternative embodiment of the disclosure.
Figure 7:
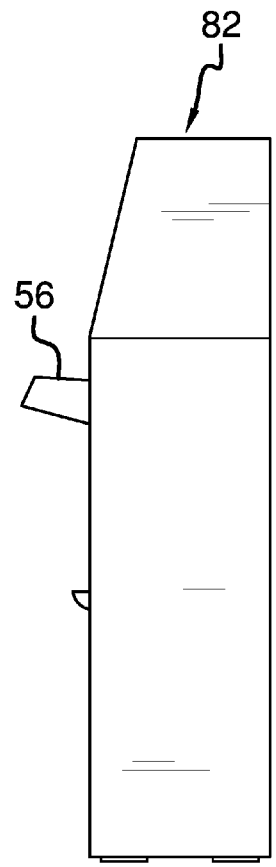
FIG. 7 is a left side view of an alternative embodiment of the disclosure.
Figure 8:
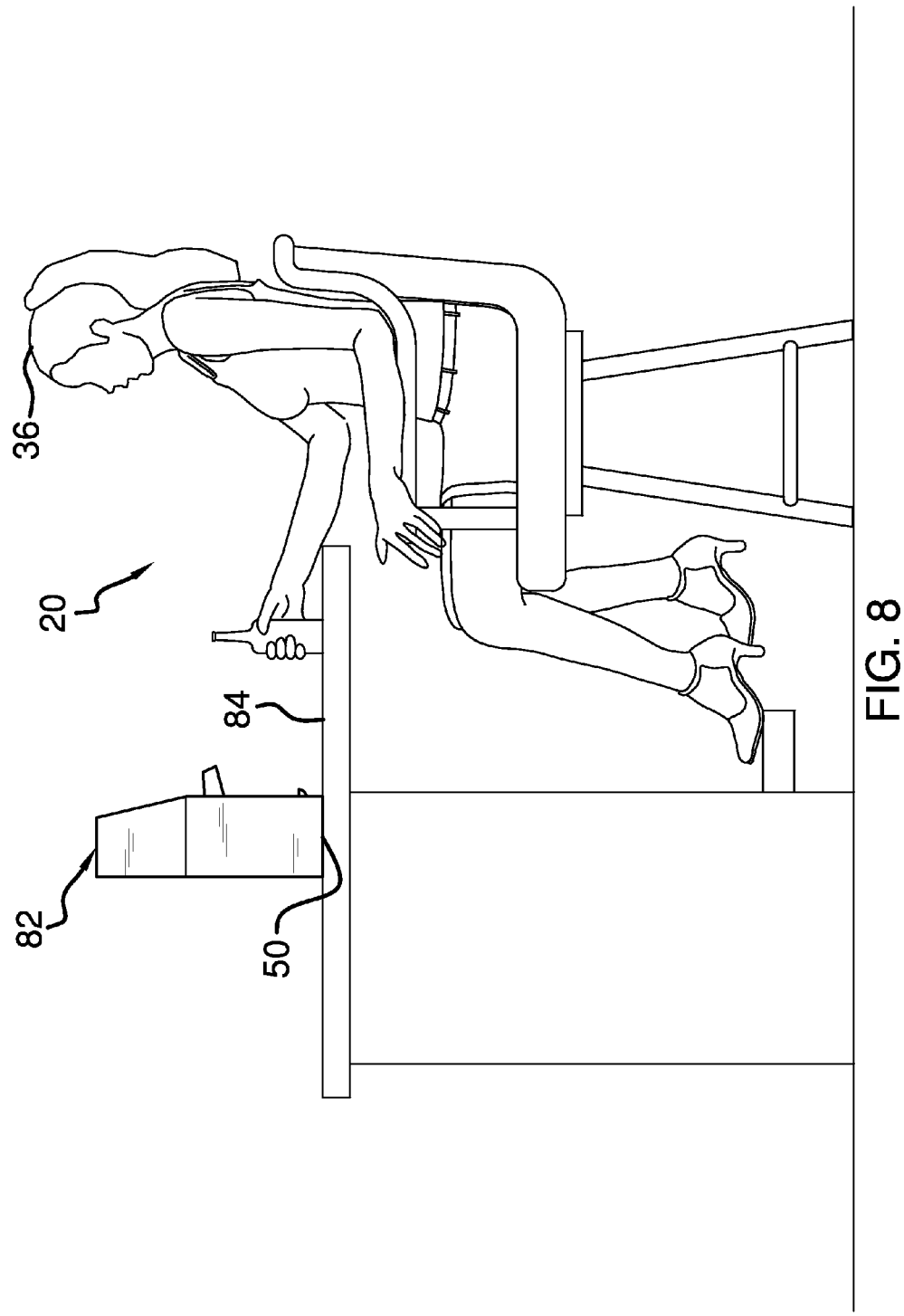
FIG. 8 is an in-use view of an alternative embodiment of the disclosure.

With reference now to the drawings, and in particular to FIGS. 1 through 8 thereof, a new kiosk device embodying the principles and concepts of an embodiment of the disclosure and generally designated by the reference numeral 10 will be described.

As best illustrated in FIGS. 1 through 8, the automated kiosk assembly 10 generally comprises a housing 12. A back side 14 of an outer wall 16 of the housing 12 is coupled to a vertical support surface 18. The vertical support surface 18 may be a wall. Additionally, the vertical support surface may be a wall in a public location 20 such as a bar, restaurant or other similar public location 20 involved in the sale of alcohol.

A processor 22 is coupled to the housing 12. The processor 22 may be an electronic processor of any conventional design. A blood alcohol analyzer 24 is coupled to the housing 12. The blood alcohol analyzer 24 is electrically coupled to the processor 22. The blood alcohol analyzer 24 may be a breathalyzer of any conventional design.

A display 26 is coupled to a front side 28 of the outer wall 16 of the housing 12. The display 26 is positioned proximate a top side 30 of the outer wall 16 of the housing 12. Additionally, the display 26 extends between a first lateral side 32 and a second lateral side 34 of the outer wall 16 of the housing 12. The display 26 is electrically coupled to the processor 22. Moreover, the display 26 may be a touch screen display of any conventional design. A user 36 touches the display 26 to actuate the processor 22.

A payment acceptor 38 is coupled the front side 28 of the outer wall 16 of the housing 12. The payment acceptor 38 is electrically coupled to the processor 22. The payment acceptor 38 accepts monetary currency from the user 36. The payment acceptor 38 is one of a plurality of the payment acceptors 40.

A cash one 42 of the plurality of payment acceptors 40 is positioned below the display 26 proximate the first lateral side 32 of the outer wall 16 of the housing 12. The cash payment acceptor 42 may be a cash payment acceptor 42 of any conventional design. A credit card one 44 of the plurality of payment acceptors 40 is positioned below the display 26 proximate the second lateral side 34 of the outer wall 16 of the housing 12. The credit card payment acceptor 44 may be a credit card reader of any conventional design.

A Smart Phone 46 one of the plurality of payment acceptors 40 is positioned between the cash payment acceptor 42 and the display 26. The Smart Phone payment acceptor 46 may be a USB port of any conventional design. Moreover, the Smart Phone payment selector 46 is selectively electrically coupled to the user's 36 Smart Phone. The Smart Phone payment 46 selector receives payment information from the user's 36 Smart Phone.

The front side 28 of the outer wall 16 of the housing 12 has a dispenser opening 48 extending therethrough. The dispenser opening 48 is positioned proximate a bottom side 50 of the outer wall 16 of the housing 12. A dispenser 52 is coupled to the front side 28 of the outer wall 16 of the housing 12. The dispenser 52 is aligned with the dispenser opening 48. Additionally, the dispenser 52 is electrically coupled to the processor 22. The dispenser 52 dispenses a straw 54 into the dispenser opening 48 when the selected one of the plurality of payment acceptors 40 receives the payment from the user 36.

An input 56 is provided. A rear side 58 of an exterior wall 60 of the input 56 is coupled to the front side 28 of the outer wall 16 of the housing 12. The input 56 extends forwardly from front side 28 of the outer wall 16 of the housing 12. A forward side 62 of the exterior wall 60 of the input 56 may have a height and a width that is less than the rear side 58 of the exterior wall 60 of the input 56. The input 56 may have a frusto-pyramidal shape.

The forward side 62 of the exterior wall 60 of the input 56 has a straw aperture 64 extending therethrough. The input 56 is fluidly coupled to the blood alcohol analyzer 24. The user 36 inserts the straw 54 into the straw aperture 64 so the straw 54 is fluidly coupled to the input 56. The user 36 exhales through the straw 54 so the blood alcohol analyzer 24 determines a blood alcohol content of the user 36.

A printer 66 is coupled to the front side 28 of the outer wall 16 of the housing 12. The printer 66 is positioned below the cash payment acceptor 42. Additionally, the printer 66 is electrically coupled to the processor 22. The printer 66 prints a receipt for the user 36 after the user 36 makes a payment with a selected one of the plurality of payment acceptors 40.

A transceiver 68 is coupled to the housing 12. The transceiver 68 is electrically coupled to the processor 22. The transceiver 68 may be an RF transceiver of any conventional design. Additionally, the transceiver 68 may utilize a Wireless Personal Access Network signal. The transceiver 68 is in electromagnetic communication with the internet.

The transceiver 68 is additionally in electromagnetic communication with an external electronic device. The external electronic device may be a telephone network. The transceiver 68 contacts a taxi service if the user's 36 blood alcohol content is above a legal limit.

A speaker 70 is coupled to the front side 28 of the outer wall 16 of the housing 12. The speaker 70 is positioned below the credit card payment acceptor 44. The speaker 70 is electrically coupled to the processor 22. The speaker 70 emits an audible sound.

A microphone 72 is coupled to the front side 28 of the outer wall 16 of the housing 12. The microphone 72 is electrically coupled to the processor 22. The user 36 speaks into the microphone 72 and listens to the speaker 70. Moreover, the user 36 utilizes the microphone 72 and the speaker 70 to communicate with the taxi service.

A plurality of light emitters 74 is coupled to the front side 28 of the outer wall 16 of the housing 12. The plurality of light emitters 74 is each positioned adjacent to an associated one of the top 30, first lateral 32, second lateral 34 and bottom 50 sides of the outer wall 16 of the housing 12. The plurality of light emitters 74 is each electrically coupled to the processor 22. The plurality of light emitter 74 emits light to illuminate the front side 28 of the outer wall 16 of the housing 12. Finally, the plurality of light emitters 74 may be comprise a neon light of any conventional design.

A power supply 76 is coupled to the housing 12. The power supply 76 is electrically coupled to the processor 22. The power supply 76 is electrically coupled to a power source 78. The power source 78 may be an electrical outlet 80 of any conventional design.

Alternatively, the housing 12 may be a free standing housing 82. The bottom side 50 of the outer wall 16 of the housing 12 abuts a horizontal support surface 84. The horizontal support surface 84 may be a bar or a countertop in the public location 20. The display 26 is one of a pair of the displays 86. A second one 88 of the pair of displays 86 is positioned proximate the bottom side 50 of the outer wall 16 of the housing 12. The second display 88 displays indicia. The indicia related to advertisements.

In use, the user 36 touches the display 26 to actuate the processor 22. The user 36 enters a payment into a selected one of the plurality of payment acceptors 40. The user 36 retrieves the straw 54 from the dispenser 52 after the straw 54 is dispensed. The user 36 places the straw 54 into the straw aperture 64 and then exhales into the straw 54. If the blood alcohol analyzer 24 determines the user's blood alcohol level is above a legal limit, the transceiver 68 contacts the taxi service for the user 36. The assembly 10 serves to dissuade the user 36 from driving while intoxicated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated kiosk assembly for determining a blood alcohol content of a user, said assembly comprising:
    a housing coupled to a support surface;
    a processor coupled to said housing;
    a blood alcohol analyzer coupled to said housing, said blood alcohol analyzer being operationally coupled to said processor;
    a display coupled to said housing, said display being operationally coupled to said processor, a user touching said display wherein the user actuates said processor;
    a payment acceptor coupled to said housing, said payment acceptor being operationally coupled to said processor, said payment acceptor accepting monetary currency from a user;
    a dispenser coupled to said housing, said dispenser being operationally coupled to said processor, said dispenser dispensing a straw when said payment acceptor receives the monetary currency from the user;
    an input coupled to said housing, said input being operationally coupled to said blood alcohol analyzer, the user operationally coupling said straw to said input, the user exhaling through said straw such that said blood alcohol analyzer determines a blood alcohol content of the user; and
    a transceiver coupled to said housing, said transceiver being operationally coupled to said processor, said transceiver being in communication with an external electronic device, said transceiver contacting a taxi service if the user's blood alcohol content is above a legal limit.

2. The assembly according to claim 1, further comprising a back side of an outer wall of said housing being coupled to the support surface.

3. The assembly according to claim 1, further comprising said blood alcohol analyzer being electrically coupled to said processor.

4. The assembly according to claim 1, further comprising:
said display being coupled to a front side of an outer wall of said housing; and
said display being electrically coupled to said processor.

5. The assembly according to claim 1, further comprising:
said payment selector being coupled to a front side of an outer wall of said housing;
said payment selector being electrically coupled to said processor; and
said payment acceptor being one of a plurality of said payment acceptors.

6. The assembly according to claim 1, further comprising a front side of an outer wall of said housing having a dispenser opening extending therethrough.

7. The assembly according to claim 1, further comprising:
said dispenser being coupled to a front side of an outer wall of said housing such that said dispenser is aligned with a dispenser opening; and
said dispenser being electrically coupled to said processor.

8. The assembly according to claim 1, further comprising:
a rear side of an exterior wall of said input being coupled to a front side of an outer wall of said housing such that said input extends forwardly from said housing; and
a forward side of said exterior wall of said input having a straw aperture extending therethrough.

9. The assembly according to claim 1, further comprising:
said input being fluidly coupled to said blood alcohol analyzer; and
the user inserting said straw into a straw aperture such that said straw is fluidly coupled to said input.

10. The assembly according to claim 1, further comprising:
said transceiver being electrically coupled to said processor; and
said transceiver being in electromagnetic communication with the external electronic device.

11. The assembly according to claim 1, further comprising:
a speaker coupled to a front side of an outer wall of said housing; and
said speaker being electrically coupled to said processor such that speaker emits an audible sound.

12. The assembly according to claim 1, further comprising:
a microphone coupled to a front side of an outer wall of said housing;
said microphone being electrically coupled to said processor; and
the user speaking into said microphone and listening to a speaker such that the user utilizes said microphone and said speaker to communicate with the taxi service.

13. The assembly according to claim 1, further comprising a power supply coupled to said housing.

14. The assembly according to claim 13, further comprising said power supply being electrically coupled to said processor.

15. The assembly according to claim 14, further comprising said power supply being electrically coupled to a power source.

16. An automated kiosk assembly for determining a blood alcohol content of a user, said assembly comprising:
a housing, a back side of an outer wall of said housing being coupled to a support surface;
a processor coupled to said housing;
a blood alcohol analyzer coupled to said housing, said blood alcohol analyzer being electrically coupled to said processor;
a display coupled to a front side of said outer wall of said housing, said display being electrically coupled to said processor, a user touching said display wherein the user actuates said processor;
a payment acceptor coupled said front side of said outer wall of said housing, said payment acceptor being electrically coupled to said processor, said payment acceptor accepting monetary currency from a user, said payment acceptor being one of a plurality of said payment acceptors;
said front side of said outer wall of said housing having a dispenser opening extending therethrough;
a dispenser coupled to said front side of said outer wall of said housing such that said dispenser is aligned with said dispenser opening, said dispenser being electrically coupled to said processor, said dispenser dispensing a straw when said payment acceptor receives the monetary currency from the user;
an input, a rear side of an exterior wall of said input being coupled to said front side of said outer wall of said housing such that said input extends forwardly from said housing, a forward side of said exterior wall of said input having a straw aperture extending therethrough, said input being fluidly coupled to said blood alcohol analyzer, the user inserting said straw into said straw aperture such that said straw is fluidly coupled to said input, the user exhaling through said straw such that said blood alcohol analyzer determines a blood alcohol content of the user;
a transceiver coupled to said housing, said transceiver being electrically coupled to said processor, said transceiver being in communication with an external electronic device, said transceiver contacting a taxi service if the user's blood alcohol content is above a legal limit;
a speaker coupled to said front side of said outer wall of said housing, said speaker being electrically coupled to said processor such that speaker emits an audible sound;
a microphone coupled to said front side of said outer wall of said housing, said microphone being electrically coupled to said processor, the user speaking into said microphone and listening to said speaker such that the user utilizes said microphone and said speaker to communicate with the taxi service; and
a power supply coupled to said housing, said power supply being electrically coupled to said processor, said power supply being electrically coupled to a power source.

* * * * *